US010657563B2

(12) United States Patent
Jung et al.

(10) Patent No.: US 10,657,563 B2
(45) Date of Patent: May 19, 2020

(54) ADVERTISEMENT INFORMATION UPDATING METHOD AND APPARATUS

(71) Applicant: Samsung Electronics Co., Ltd., Gyeonggi-do (KR)

(72) Inventors: Bu-Seop Jung, Gyeonggi-do (KR); Young-Kwan Chung, Gyeonggi-do (KR); Yong-Hae Choi, Gyeonggi-do (KR); Jong-Mu Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 857 days.

(21) Appl. No.: 15/122,746

(22) PCT Filed: Mar. 9, 2015

(86) PCT No.: PCT/KR2015/002254
§ 371 (c)(1),
(2) Date: Aug. 31, 2016

(87) PCT Pub. No.: WO2015/133880
PCT Pub. Date: Sep. 11, 2015

(65) Prior Publication Data
US 2017/0076332 A1 Mar. 16, 2017

(30) Foreign Application Priority Data
Mar. 7, 2014 (KR) ........................ 10-2014-0027394

(51) Int. Cl.
*G06Q 30/02* (2012.01)
*H04W 4/21* (2018.01)
(Continued)

(52) U.S. Cl.
CPC ..... *G06Q 30/0267* (2013.01); *G06Q 30/0261* (2013.01); *H04L 67/42* (2013.01); *H04W 4/21* (2018.02); *H04W 4/80* (2018.02)

(58) Field of Classification Search
CPC ...................................................... G06Q 30/02
See application file for complete search history.

(56) References Cited

U.S. PATENT DOCUMENTS

| 7,561,890 B2 * | 7/2009 | Jendbro ................. H04L 41/12 455/456.6 |
| 7,606,913 B2 * | 10/2009 | Shiga ..................... G06Q 30/02 379/114.01 |

(Continued)

FOREIGN PATENT DOCUMENTS

| JP | 2013-176045 A | 9/2013 |
| KR | 10-2004-0001183 A | 1/2004 |

(Continued)

OTHER PUBLICATIONS

"MobAd Technical Specification—Core Specification"; Candidate Version 1.0; Apr. 8, 2010; Open Mobile Alliance Ltd.
European Search Report dated Jul. 27, 2017.

*Primary Examiner* — Hajime Rojas
*Assistant Examiner* — Thuy N Nguyen
(74) *Attorney, Agent, or Firm* — Cha & Reiter, LLC

(57) ABSTRACT

According to the present invention, a user device can obtain together, from an advertisement server for providing an advertisement service, via a neighbor access point device, update condition information on advertisement information in the course of obtaining the advertisement information. In addition, if the update condition information is satisfactory, the user device requests the advertisement information from the advertisement server via an AP and stores the advertise- (Continued)

ment information received in response to the request, thereby being capable of updating the advertisement information.

18 Claims, 8 Drawing Sheets

(51) Int. Cl.
  *H04W 4/80* (2018.01)
  *H04L 29/06* (2006.01)

(56) References Cited

U.S. PATENT DOCUMENTS

| | | |
|---|---|---|
| 8,259,692 B2 | 9/2012 | Bajko |
| 9,854,505 B2* | 12/2017 | Karaoguz .......... G06Q 30/0241 |
| 2005/0215238 A1 | 9/2005 | Macaluso |
| 2009/0089166 A1* | 4/2009 | Happonen .......... G06Q 30/0257 |
| | | 705/14.55 |
| 2010/0121690 A1 | 5/2010 | Lee et al. |
| 2010/0313020 A1 | 12/2010 | Montemurro |
| 2011/0072456 A1 | 3/2011 | White et al. |
| 2011/0099606 A1 | 4/2011 | Choi et al. |
| 2011/0153426 A1* | 6/2011 | Reddy .................. G06Q 30/02 |
| | | 705/14.58 |
| 2011/0276400 A1* | 11/2011 | Kurnit .................. G06Q 30/02 |
| | | 705/14.55 |
| 2012/0004900 A1 | 1/2012 | Chen et al. |
| 2012/0243524 A1 | 9/2012 | Verma et al. |
| 2013/0007850 A1 | 1/2013 | Lambert |
| 2013/0223341 A1 | 8/2013 | Kim et al. |
| 2013/0232008 A1* | 9/2013 | Macaluso .............. G06Q 30/02 |
| | | 705/14.64 |
| 2013/0265985 A1 | 10/2013 | Salkintzis |
| 2013/0346208 A1* | 12/2013 | Bouret .................. G06Q 30/00 |
| | | 705/14.64 |
| 2014/0122242 A1* | 5/2014 | Stephenson ............ H04W 4/21 |
| | | 705/14.64 |
| 2014/0304078 A1* | 10/2014 | Abraham ........... G06Q 30/0264 |
| | | 705/14.61 |
| 2016/0100283 A1* | 4/2016 | DiFazio .............. H04W 64/003 |
| | | 455/456.1 |

FOREIGN PATENT DOCUMENTS

| | | |
|---|---|---|
| KR | 10-2005-0067898 A | 7/2005 |
| KR | 10-1002009 B1 | 12/2010 |
| KR | 10-2011-0045154 A | 5/2011 |

* cited by examiner

ADVERTISEMENT INFORMATION UPDATING METHOD AND APPARATUS

PRIORITY

This application is a National Phase Entry of PCT International Application No. PCT/KR2015/002254, which was filed on Mar. 9, 2015, and claims a priority to Korean Patent Application No. 10-2014-0027394, which was filed on Mar. 7, 2014, the contents of which are incorporated herein by reference.

TECHNICAL FIELD

The present invention relates to an advertisement service and, more particularly, to a method and an apparatus for efficiently updating advertisement information stored in a user device.

BACKGROUND ART

The 802.11u standard corresponds to the standard defined for the purpose of discovering information on an external network connected to an AP (Access Point). Particularly, the 802.11u standard allows a user device to discover network information and a network without a connection with the AP. FIG. 1 illustrates an operation in which the user device discovers a network with an external advertisement server according to a protocol of 802.11u.

Referring to FIG. 1, a user device 10 receives a beacon message broadcasted by an AP 20 in step 51, transmits/receives a probe request and response message to/from the AP 20 in steps 53 and 55, and acquires information indicating provision of advertisement service through the AP 20 in an AP scan process. Thereafter, the user device 10 transmits an advertisement service request message to the AP 20 in step 57 and, accordingly, the AP 20 makes a request for the advertisement service to an advertisement server 30 in step 59. The advertisement server 30 transfers advertisement information to be transmitted to the user device 10 to the AP 20 in response to the request of the AP 20 in step 61. The advertisement information may include information corresponding to each of a plurality of advertisement items. The AP 20 transmits an advertisement service response message including advertisement information to the user device 10 in step 63, and the user device 10 provides a user with the received advertisement information. Thereafter, when a predetermined scan period passes in step 64, the user device 10 repeatedly perform the AP scan process using the probe request and response message in steps 53 and 55, and the advertisement information request process using the advertisement service request and response message in steps 57 to 63.

DETAILED DESCRIPTION OF THE INVENTION

Technical Problem

When advertisement information is updated by an advertisement server based on the conventional 802.11u standard, updating the corresponding advertisement information through a periodic AP scan process and advertisement service request process by the user device 10 becomes a problem. That is, even though the advertisement information is not updated in the side of the advertisement server 30, the terminal should periodically identify whether the advertisement information is updated. Such an operation is unnecessary, which increases current consumption of the user device 10 and applies a larger load to the advertisement server 30. Since the user device 10 cannot stay in a sleep state in order to periodically perform the AP scan process, current consumption relatively increases, which reduces a usable time when the user device 10 is a portable device. When a plurality of user devices transmit an advertisement service request message to the advertisement server 30, larger loads applied to the advertisement server 30 and thus a response time becomes longer.

Secondly, the biggest problem of the prior art illustrated in FIG. 1 is that the user device 10 cannot accurately grasp a time point when an update of advertisement information is required. That is, the user device 10 triggers the AP scan process and the advertisement service request process merely to update the advertisement information according to a predetermined period. As described above, since the corresponding advertisement information is updated through a predetermined period within the user device 10 regardless of the advertisement server 30, the time point of the update of the advertisement information of the user device 10 is somewhat different from an actual time point of the update of the advertisement information on the advertisement server 30. Accordingly, it is required to transfer the update advertisement information to the user without any delay.

Thirdly, the problem of the prior art illustrated in FIG. 1 is that the user device 10 should always load all pieces of advertisement information through the advertisement service request process. Even though only some of the advertisement information changes in the same advertisement server 30, the advertisement server 30 transfers all pieces of the advertisement information, which causes an exchange of unnecessary packets, thereby causing a response delay. The plurality of user devices receive all pieces of advertisement information to update the advertisement information every time, so that the delay may increase due to the load of the advertisement server 30, the network load, and unnecessary data processing in the user device.

Technical Solution

In order to resolve the above described problems, the present invention provides a method and an apparatus for actively performing a scan process and an advertisement service request process by determining a time point when an update of advertisement information is required by a user device.

The present invention provides a method and an apparatus for reducing power consumption of the user device to acquire advertisement information.

The present invention provides a method and an apparatus for reducing loads of an advertisement server according to provision of advertisement information.

The present invention provides a method and an apparatus for acquiring advertisement information without any delay.

Meanwhile, according to the present invention, a method of updating advertisement information by a user device in an advertisement service system including an advertisement server that services advertisement information of service contents provided from a content provider, at least one access point linked with the advertisement server, and at least one user device are provided. The method includes: scanning for an access point device; transmitting an advertisement service request message that makes a request for advertisement information to the access point device; receiving an advertisement service response message including at least one piece of advertisement information and update condition information corresponding to the at least one piece of advertisement information from the access point; and determining whether to update the at least one piece of advertisement information by using the update condition information and updating the at least one piece of advertisement information.

According to the present invention, the update condition information may include validity term information indicating a validity term corresponding to each of the at least one piece of advertisement information, and the updating of the at least one piece of advertisement information may include: matching and storing the at least one piece of advertisement information and the validity term information in a storage unit; detecting expired advertisement information in the at least one piece of advertisement information; and transmitting an advertisement service request message of the expired advertisement information.

According to the present invention, the update condition information may include location identification information indicating a valid area of each of the at least one piece of advertisement information, and the updating the at least one piece of advertisement information may include: matching and storing the at least one piece of advertisement information and the location identification information; when a predetermined scan period passes, transmitting a probe request message; receiving a probe response message; detecting location identification information included in the probe response message; and when the detected location identification information is different from the stored location identification information, transmitting an advertisement service request message.

According to the present invention, an apparatus for updating advertisement information in an advertisement service system including an advertisement server that services advertisement information of service contents provided from a content provider, at least one access point linked with the advertisement server, and at least one user device are provided. The apparatus includes: a short-range communication module that performs short-range wireless communication with a neighboring access point device; a storage unit; and a controller that scans for an access point device by controlling the short-range communication module, transmits an advertisement service request message that makes a request for advertisement information to the access point device, receives an advertisement service response message including at least one piece of advertisement information and update condition information corresponding to the at least one piece of advertisement information from the access point, stores the at least one piece of advertisement information and the update condition information in the storage unit, determines whether to update the at least one piece of advertisement information by using the update condition information, and updates the at least one piece of advertisement information.

According to the present invention, the update condition information may include validity term information indicating a validity term corresponding to each of the at least one piece of advertisement information, and the controller may match and store the at least one piece of advertisement information and the validity term information in the storage unit, detect expired advertisement information in the at least one piece of advertisement information, and transmit an advertisement service request message of the expired advertisement information through the short-range communication module.

According to the present invention, the update condition information may include location identification information indicating a valid area of each of the at least one piece of advertisement information, and the controller may match and store the at least one piece of advertisement information and the location identification information in the storage unit, transmit a probe request message through the short-range communication module when a predetermined scan period passes, receive a probe response message, detect location identification information included in the probe response message and, when the detected location identification information is different from the stored location identification information, transmit an advertisement service request message through the short-range communication module.

Effects of the Invention

According to the present invention, a user device can determine a time point when an update of advertisement information is required and actively perform a scan process and an advertisement service request process. Further, according to the present invention, it is possible to reduce power consumption of the user device for acquiring advertisement information and reduce a load of an advertisement server according to provision of the advertisement information. In addition, according to the present invention, it is possible to acquire advertisement information without delay.

MODE FOR CARRYING OUT THE INVENTION

Figure 1:
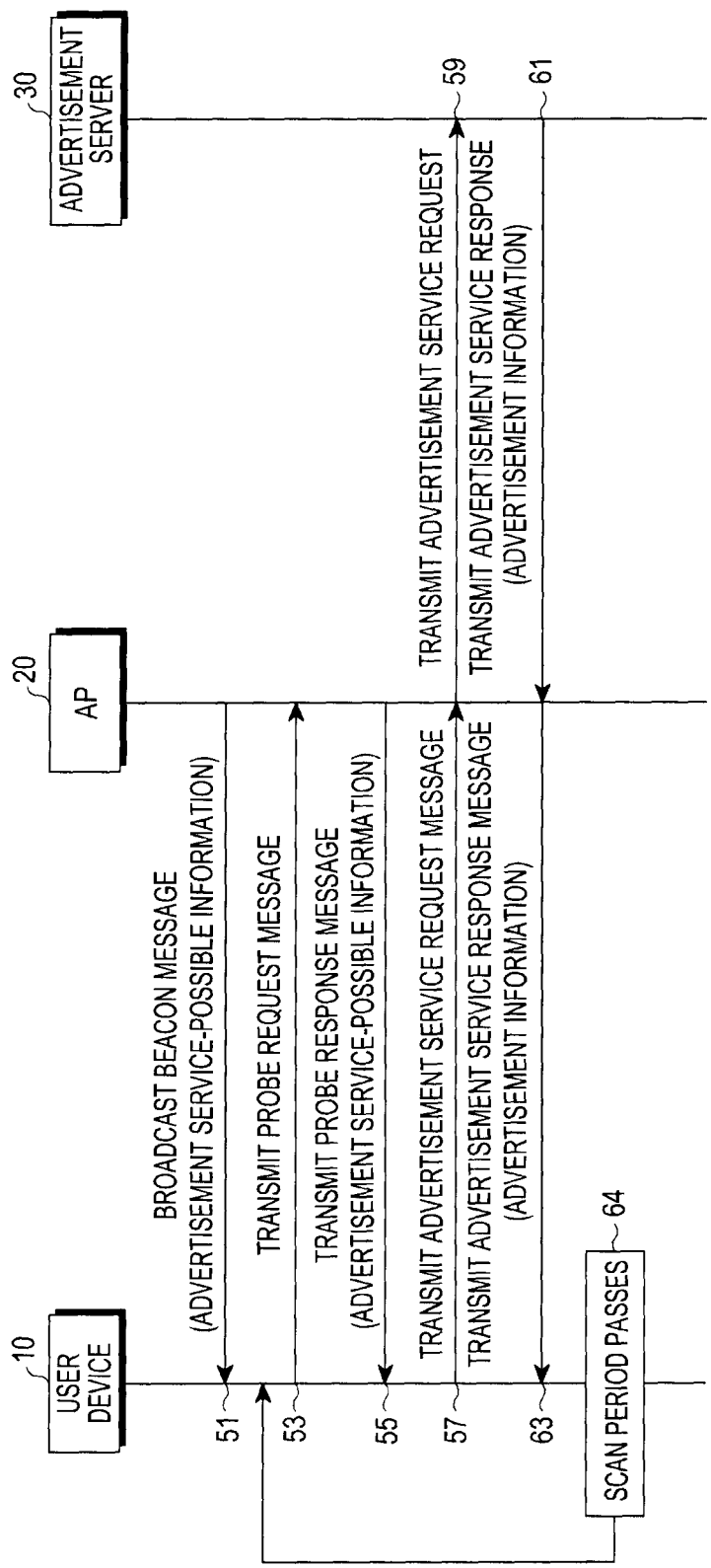
FIG. 1 illustrates a conventional process of transferring advertisement information.

Hereinafter, the embodiments of the present invention will be described in detail with reference to the accompanying drawings. It should be noted that the same reference numerals and symbols denotes the identical structural elements although the structural elements are depicted in another drawing. Further, in the description of the present invention, when it is determined that the detailed description of the related well-known functions or structures causes a confusion in the subject matter of the present invention, the description will be omitted.

A user device according to various embodiments of the present invention may be a device with a communication function. For example, the electronic device may be a combination of one or more of a smartphone, a tablet personal computer, a mobile phone, a video phone, an e-book reader, a desktop personal computer, a laptop personal computer, a netbook computer, a Personal Digital Assistant (PDA), a Portable Multimedia Player (PMP), an MP3 player, a mobile medical device, an electronic bracelet, an electronic necklace, an electronic appcessory, a camera, a wearable device, an electronic clock, a wrist watch, a home appliance (e.g., a refrigerator, an air conditioner, a cleaner, an oven, a microwave oven, a washing machine, a vacuum cleaner, etc.), an artificial intelligent robot, a Television (TV), a Digital Video Disk (DVD) player, an audio player, various medical machines (e.g., a Magnetic Resonance Angiography (MRA), a Magnetic Resonance Imaging (MRI), a Computed Tomography (CT), a tomography camera, a sonography device, etc.), a navigation device, a Global Positioning System (GPS) receiver, an Event Data Recorder (EDR), a Flight Data Recorder (FDR), a set-top box, a TV box (e.g., SamSung HomeSync™, Apple TV™, or Google TV™), an electronic dictionary, a vehicle infotainment device, electronic equipment for a ship (e.g., navigation equipment for a ship, a gyrocompass, etc.), avionic equipment, a security device, an electronic cloth, an electronic key, a camcorder, a game console, a Head-Mounted Display (HMD), a flat panel display device, an electronic frame, an electronic album, a furniture or a part of a building/structure including a communication function, an electronic board, an electronic signature receiving device, a projector, etc. It will be apparent to those skilled in the art that user devices according to various embodiments of the present invention are not limited to the above described devices.

According to the present invention, a user device may acquire update condition information of advertisement information in a process of acquiring the advertisement information from an advertisement server that provides an advertisement server through a neighboring access point (hereinafter, referred to as "AP"). Further, when the user device becomes a state that meets the update condition information, the user device may make a request for advertisement information to the advertisement server through the AP and store the received advertisement information in response to the request, so as to update the advertisement information.

Figure 2:
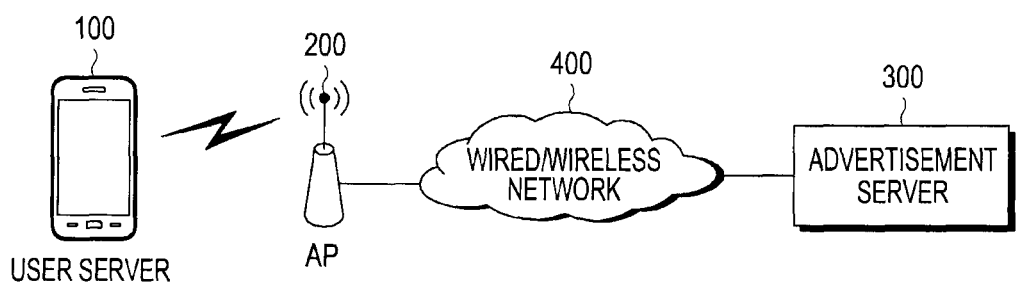
FIG. 2 illustrates a configuration of a service system according to an embodiment of the present invention.

An example of a service system to which the present invention is applied is illustrated in FIG. 2. FIG. 2 illustrates a configuration of a service system according to an embodiment of the present invention. Referring to FIG. 2, the service system may include a user device 100, an AP 200, a wired/wireless network 400, and an advertisement server 300. In the following description, it is assumed that the user device 100 is located within an area in which communication of the AP 200 is possible.

The advertisement server 300 illustrated in FIG. 2 may transfer advertisement information of various service contents, which are provided by one or more content providers, to the user device through at least one AP. Further, according to an embodiment of the present invention, when providing the advertisement information to the user device, the advertisement server 300 may also transfer update condition information to allow the user device to update advertisement data at a proper time point.

The service contents may be, for example, coupons, tickets, product introduction, company introduction, store introduction, or the like. The advertisement information corresponds to brief guide information on the service contents. In the following description, it is assumed that one piece of advertisement information corresponds to one service content to assist understanding of the present invention.

Server identification information (hereinafter, referred to as "AS ID") for identifying the advertisement server is allocated to the advertisement server 300. The advertisement server 300 may match and store content provider identification information (hereinafter, referred to as "venue ID") for identifying a content provider, advertisement information related to the corresponding content provider, and update condition information. The update condition information corresponds to information indicating an update condition of the advertisement information and may include at least one of validity term and location identification information (location ID) according to various embodiments of the present invention. The validity term corresponds to information indicating a valid period of the advertisement information. The location identification information corresponds to information indicating a geographical area in which the advertisement information or relevant service contents are valid. The location identification information may be, for example, an actual location coordinate or a particular number corresponding to any region or area. The update condition information may be transferred to the user device along with the advertisement information. As described above, as the advertisement server 300 transfers information on the valid term or valid area of the advertisement information to the user device, the user device may update the advertisement information at a proper time point.

In the following description, according to various embodiments of the present invention, a first embodiment in which the update condition information includes only time information, a second embodiment in which the update condition information includes only location identification information, and a third embodiment in which update condition information includes validity term information and location identification information will be described as examples.

The AP 200 is a device that communicates with the user device 100 through short-range communication and is connected to one or more external networks included in the wired/wireless network 400. Further, the AP 200 is a device that provides an advertisement service to the user device 100 through a link with the advertisement server 300. According to an embodiment of the present invention, the AP 200 may store an AS ID of the linked advertisement server and a venue ID of a content provider related to the linked advertisement server. According to an embodiment of the present invention, the AP 200 may additionally store the location identification information. When the location identification information is stored, the AP 200 may insert the location identification information into a beacon message and a probe response message used in an AP scan process of the user device.

In order to scan for an AP of the user device located within a communicable area, the AP 200 periodically broadcasts a beacon message including information indicating that the advertisement service is possible through short-range communication. Alternatively, when the AP 200 receives a probe request message for the AP scan from the user device, the AP 200 transmits a probe response message including advertisement service-possible information to the corresponding user device. According to an embodiment of the present invention, when the user device performs the AP scan process, the AP 200 may transfer the AS ID and the venue ID to the user device.

Further, when the AP 200 receives an advertisement request message from the user device, the AP 200 transfers the advertisement request message to the advertisement server 300 and receives update condition information from the advertisement server 300 along with the advertisement information in response to the advertisement request message. The AP 200 transmits the advertisement information and the update condition information to the corresponding user device.

The user device 100 is a device that can perform short-range wireless communication with the AP and supports the advertisement service. The user device 100 may scan for the AP 200 that supports the advertisement service and may make a request for and receive advertisement information provided through the AP 200 from the scanned for AP 200. Further, the user device 100 may determine a proper update time point of the advertisement information by using the update condition information transferred along with the advertisement information and make a request for the advertisement information, so as to update the advertisement information.

Figure 3:
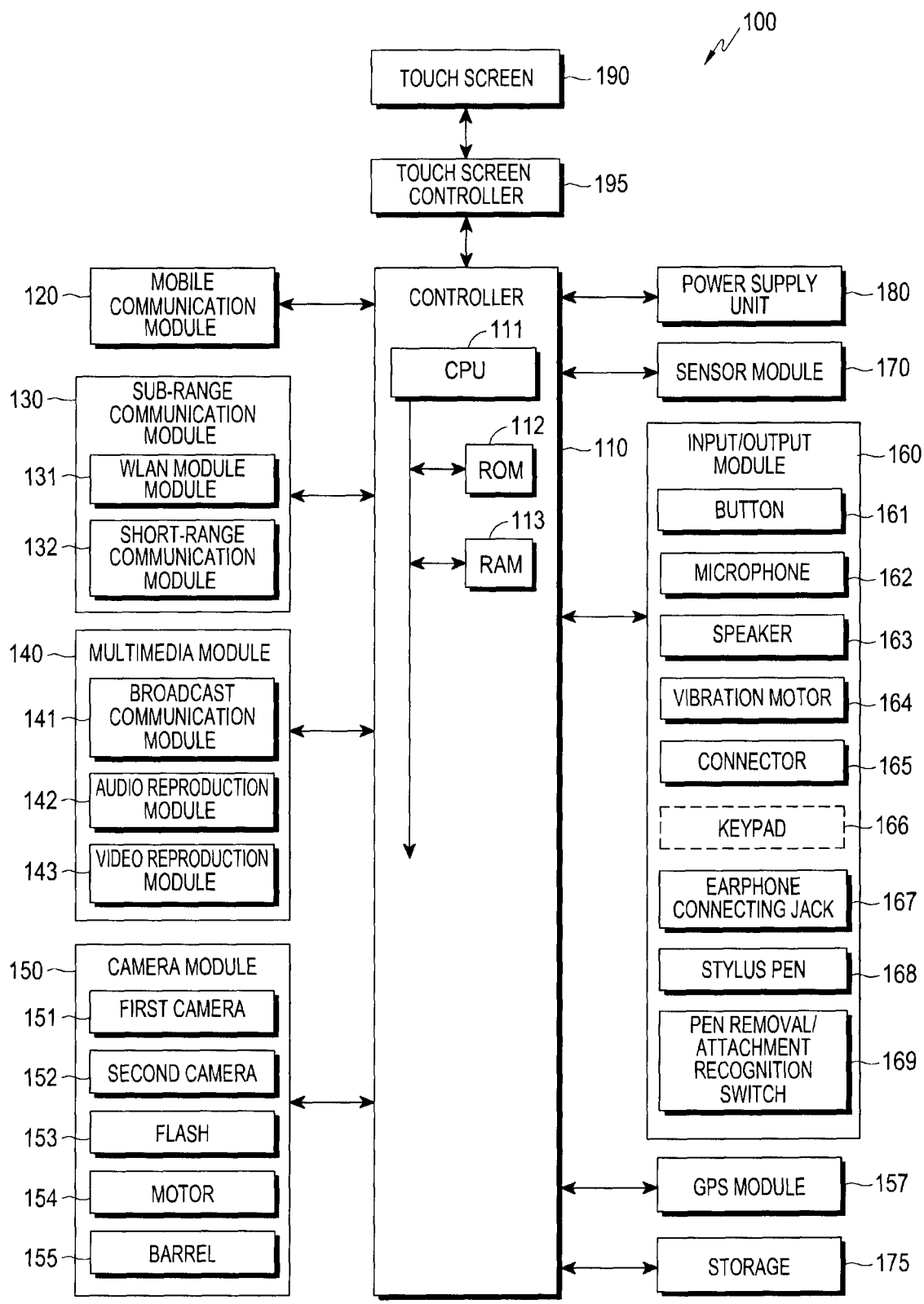
FIG. 3 illustrates a configuration of a user device according to an embodiment of the present invention.

A configuration of the user device 100 is illustrated in FIG. 3. FIG. 3 illustrates the configuration of the user device 100 according to an embodiment of the present invention. Referring to FIG. 3, the user device 100 (hereinafter, also referred to as a 'device') may be connected with an external device (not shown) using a mobile communication module 120, a sub communication module 130, and a connector 165. The "external device" includes another device (not shown), a mobile phone (not shown), a smart phone (not shown), a tablet PC (not shown), and a server (not shown). Referring to FIG. 3, the device 100 includes a touch screen 190 and a touch screen controller 195. Further, the device 100 may include a multimedia module 140, a camera module 150, a GPS module 157, an input/output module 160, a sensor module 170, a power supply unit 180, and a storage unit 175. The device 100 may include the mobile communication module 120 and the sub communication module 130. The sub communication module 130 may include a WLAN module 131, and may further include a short-range communication module 132. The multimedia module 140 includes at least one of a broadcast communication module 141, an audio reproduction module 142, and a video reproduction module 143. The camera module 150 includes at least one of a first camera 151 and a second camera 152, and the input/output module 160 includes at least one of a button 161, a microphone 162, a speaker 163, a vibration motor 164, a connector 165, and a keypad 166.

The controller 110 may include a Central Processing Unit (CPU) 111, a Read-Only Memory (ROM) 112 which stores a control program for controlling the device 100, and a Random Access Memory (RAM) 113 which stores signals or data input from the outside of the device 100, or is used as a storage region for operations performed by the device 100. The CPU 111 may include single core, dual core, triple core, quadruple core, or five or more cores. The CPU 111, the ROM 112, and the RAM 113 may be mutually connected through an internal bus.

The controller 110 may control the mobile communication module 120, the sub communication module 130, the multimedia module 140, the camera module 150, the GPS module 157 the input/output module 160, the sensor module 170, the power supply unit 180, the storage unit 175, the touch screen 190, and the touch screen controller 195.

The mobile communication module 120 connects the external device to the device 100 through mobile communication by using one or more antennas (not shown) under a control of the controller 110. The mobile communication module 120 transmits/receives a radio signal for a voice call, a video call, a Short Message Service (SMS), or a Multimedia Message Service (MMS) to/from a mobile phone (not shown), a smart phone (not shown), a tablet PC, or another device (not shown) having a phone number input into the device 100.

The sub communication module 130 may include the WLAN module 131, and may further include the short-range communication module 132.

The WLAN module 131 may be connected to the Internet in a place where a radio AP is installed according to a control of the controller 110. The WLAN module 131 supports a wireless LAN standard (IEEE802.11x) of the Institute of Electrical and Electronics Engineers (IEEE). At this time, it may be assumed that the WLAN module 131 according to various embodiments of the present invention supports an advertisement service function according to the specification of IEEE 802.11u. Accordingly, the controller 110 according to various embodiments of the present invention may search for a neighboring AP according to a predetermined time period by repeating channel scan, listen, and search of IEEE 802.11 through the sub communication module 130.

The short-range communication module 132 may wirelessly perform short-range communication between the device 100 and an image forming device (not shown) according to a control of the controller 110. The sub communication scheme may include Bluetooth and Infrared Data Association (IrDA) communication.

The device 100 may include at least one of the mobile communication module 120 and the sub communication module 130 according to a capability thereof. For example, the device 100 may include a combination of the mobile communication module 120 and the sub communication module 130 according to a capability thereof.

The multimedia module 140 may include the broadcast communication module 141, the audio reproduction module 142 or the video reproduction module 143. The broadcast communication module 141 may receive a broadcasting signal (for example, a TV broadcasting signal, a radio broadcasting signal, or a data broadcasting signal) or broadcasting additional information (for example, Electric Program Guide (EPS) or Electric Service Guide (ESG)) which are transmitted from a broadcasting station through a broadcasting communication antenna (not shown) under the control of the controller 110. The audio reproduction module 142 may reproduce a stored or received digital audio file (for example, a file having a file extension of mp3, wma, ogg, or way) under a control of the controller 110. The video reproduction module 143 may reproduce a digital video file (for example, a file having a file extension of mpeg, mpg, mp4, avi, mov, or mkv) stored or received, under a control of the controller 110. The video reproduction module 143 may reproduce a digital audio file.

The multimedia module 140 may include the audio reproduction module 142 and the video reproduction module 143 except for the broadcast communication module 141. Further, the audio reproduction module 142 or the video reproduction module 143 of the multimedia module 140 may be included in the controller 110.

The camera module 150 may include at least one of the first camera 151 and the second camera 152 which photograph a still image or a moving image under the control of the controller 110. Further, the first camera 151 or the second camera 152 may include an auxiliary light source (for example, a flash (not shown)) for providing a light amount required for the photographing. The first camera 151 may be disposed on a front surface of the device 100, and the second camera 152 may be disposed on a rear surface of the device 100.

The GPS module 157 may receive radio waves from a plurality of GPS satellites (not shown) in Earth's orbit and may calculate a position of the device 100 by using Time of Arrival from the GPS satellites to the device 100.

The input/output module 160 may include at least one of a plurality of buttons 161, a microphone 162, a speaker 163, a vibration motor 164, a connector 165, and a keypad 166.

The buttons 161 may be disposed on a front surface, a side surface or a rear surface of a housing of the device 100, and may include an electric power/lock button (not shown), a volume control button (not shown), a menu button, a home button, a back button, and a search button 161.

The microphone 162 receives a voice or a sound to generate an electrical signal under a control of the controller 110.

The speaker 163 may output sounds corresponding to various signals (for example, a wireless signal, a broadcasting signal, a digital audio file, a digital video file, photographing, and the like) of the mobile communication module 120, the subcommunication module 130, the multimedia module 140 or the camera module 150 to the outside of the apparatus 100 under a control of the controller 110. The speaker 163 may output sounds (for example, a button operation sound or a ringtone corresponding to a voice call) corresponding to functions which the apparatus 100 performs. One or more speakers 163 may be formed on a suitable position or positions of the housing of the device 100.

The vibration motor 164 may convert an electrical signal into a mechanical vibration under the control of the controller 110. For example, when the device 100 in a vibration mode receives a voice call from another device (not shown), a vibration motor 164 is operated. One or more vibration motors 164 may be formed within the housing of the device 100. The vibration motor 164 may operate in response to a touch operation of a user who touches the touch screen 190, and a continuous movement of a touch on the touch screen 190.

The connector 165 may be used as an interface which interconnects the device 100 and an external device (not shown) or a power source (not shown). Data stored in the storage unit 175 of the device 100 may be transmitted to the external device (not shown) or received from the external device (not shown) through a wired cable connected to the connector 165 under the control of the controller 110. Power may be input from a power source (not shown) or a battery (not shown) may be charged, through the wired cable connected to the connector 165.

The keypad 166 may receive a key input from a user in order to control the device 100. The keypad 166 includes a physical keypad (not shown) formed in the device 100 or a virtual keypad (not shown) displayed on the touch screen 190. The physical keypad (not show) formed on the device 100 may be excluded according to the capability or structure of the device 100.

The sensor module 170 includes at least one sensor for detecting a status of the device 100. For example, the sensor module 170 may include a proximity sensor which detects proximity of a user to the device 100 or proximity of a finger, a pen, or the like to the screen, an illuminance sensor (not shown) which detects an amount of light around the device 100, an acceleration sensor which detects an operation (for example, a rotation of the device 100, or acceleration or vibration applied to the device 100) of the device 100. At least one sensor may detect a status including the orientation and inclination of the device 100, generate a signal corresponding to the detection, and transmit the signal to the controller 110. The sensors of the sensor module 170 may be added or omitted according to the capability of the device 100.

The power supply unit 180 may supply power to at least one battery (not shown) arranged at the housing of the device 100 according to a control of the controller 110. At least one battery (not shown) supplies power to the device 100. Further, the power supply unit 180 may supply, to the device 100, power input from an external power source (not shown) through a wired cable connected to the connector 165.

The storage unit 175 may store signals or data which input/output in accordance with an operation of the mobile communication module 120, sub communication module 130, the multimedia module 140, the camera module 150, the GPS module 157, the input/output module 160, the sensor module 170, the touch screen 190, and a status information client under the control of the controller 110. The storage unit 175 may store control programs and applications for controlling the device 100 or the controller 110.

The term "storage unit" includes the storage unit 175, the ROM 112 and the RAM 113 within the controller 110, or a memory card (not shown) (for example, an SD card or a memory stick) mounted to the device 100. Further, the ROM 112 and the RAM 113 within the controller 110 may be omitted, and the ROM 112 or the RAM 113 may be included in the storage unit 175. The storage unit may include a non-volatile memory, a volatile memory, a Hard Disk Drive (HDD) or a Solid State Drive (SDD). Further, the storage unit 175 may match and store advertisement information received from the AP 200, the AS ID, the venue ID, and the update condition information according to a control of the controller 110.

The touch screen 190 may provide a user with a user interface corresponding to various services (for example, a voice call, data transmission, broadcasting, and photographing). The touch screen 190 includes a touch panel and a display panel, and the touch panel is mounted onto an upper portion of the display panel.

The touch screen controller 195 displays various pieces of data input by the controller 110 on the display panel by driving the display panel according to a control of the controller 110. The display panel may be a panel such as an LCD or an AMOLED, and may display various operation statuses of the device 100, and various images according to an application execution and a service.

The touch panel corresponds to a panel which may receive at least one touch through various objects, for example, a user's body (for example, fingers including a thumb) or a touch input means, for example, an electronic pen (stylus pen). Further, the touch panel may receive successive motions of one touch among one or more touches. The touch panel may transmit an analog signal corresponding to the trace of touch according to the successive motions of the input touch to the touch screen controller 195.

In the present invention, the touch is not limited to contact between the touch screen 190 and the user's body or the touch input means, and may include non-contact. A distance from the touch screen 190 that can be detected may be changed according to the capability or the structure of the device 100. The touch screen 190 may be implemented, for example, in a resistive type, a capacitive type, an infrared type, an Electro Magnetic Resonance (EMR) type or an acoustic wave type, and also may be implemented in a combination of one or more thereof.

Figure 4:
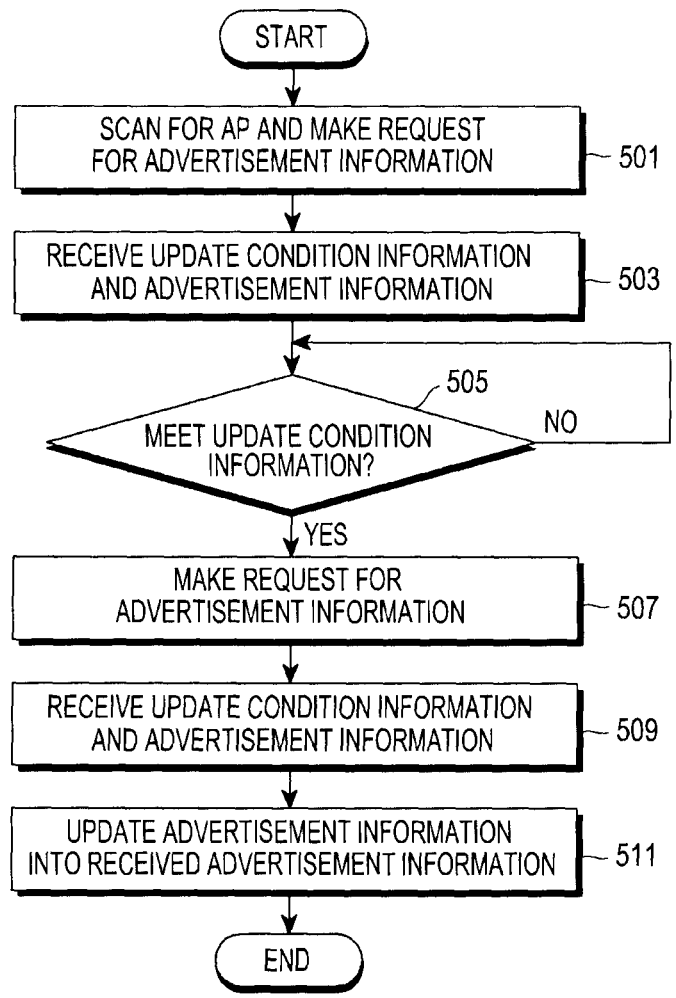
FIG. 4 illustrates an operation process of the user device according to an embodiment of the present invention.

The process in which the user device 100 configured as described above receives and stores advertisement information and updates the stored advertisement information as necessary is illustrated in FIG. 4 according to an embodiment of the present invention. FIG. 4 illustrates an operation process of the user device 100 according to an embodiment of the present invention.

Referring to FIG. 4, the controller 110 of the user device 100 scans for a neighboring AP by using the sub communication module 130 and, when there is the found AP, makes a request for advertisement information to the corresponding AP in step 501. The scanning for the neighboring AP is performed as the user device 100 receives a beacon message periodically broadcasted by the AP or probe request and response messages are transmitted and received between the user device 100 and the AP. According to an embodiment of the present invention, the beacon message and the probe response message may include an AS ID of the advertisement server linked with the AP and a venue ID of the content provider related to the advertisement information. When the AP 200 is scanned for through the AP scan process, the controller 110 of the user device 100 makes a request for the advertisement information by transmitting an advertisement service request message to the AP 200 through the sub communication module 130.

The AP 200 having received the request for the advertisement information transmits an advertisement request to the advertisement server 300, and the advertisement server 300 transmits at least one piece of advertisement information and update condition information related to each piece of the advertisement information to the AP 200 in response to the advertisement request. The AP 200 transmits the advertisement information and the update condition information to the user device 100 and, accordingly, the controller 110 of the user device 100 receives the advertisement information and the update condition information through the sub communication module 130 in step 503. The update condition information may be at least one of validity term and location identification information (location ID) of the advertisement information according to an embodiment of the present invention.

The controller 110 of the user device 100 matches the advertisement information, the update condition information, and the AS ID and the venue ID acquired in the AP scan process and stores the matched information in the storage unit 175, and then identifies whether the current situation meets the update condition of one piece of advertisement information in step 505. When the update condition is met, the controller 110 determines that the corresponding advertisement information is required to be updated, and makes a request for the advertisement information to the AP 200 through the sub communication module 130 in step 507.

According to a first embodiment of the present invention, when the update condition information corresponds to the validity term, the controller 110 may set a timer for the validity term of each piece of advertisement information and identify whether the validity term has expired, so as to determine whether the update condition is met. When it is identified that the validity term has expired, the controller 110 transmits a probe request message. Further, the controller 110 compares an AS ID and a venue ID included in a probe response message received from the AP 200 in response to the probe request message with the AS ID and the venue ID of the advertisement information of which the validity term has expired and, when the AS IDs and the venue IDs match each other, makes a request for the corresponding advertisement information to the advertisement server 300 through the AP 200.

According to a second embodiment of the present invention, when the update condition information corresponds to the location identification information, the controller 110 periodically transmits the probe request message to the AP 200 and compare location identification information include in the probe response message received from the AP 200 with location identification information stored in the storage unit 175 in response to the probe request message, so as to determine whether the update condition is met. When the two pieces of location identification information do not match, the controller 110 makes a request for the advertisement information to the advertisement server 300 through the AP 200.

According to a third embodiment of the present invention, when the update condition information includes both the validity term and the location identification information, the controller 110 identifies both the validity term and the location identification information and determine whether the update condition is met.

The AP 200 having received the request for the advertisement information transmits an advertisement request to the advertisement server 300, and the advertisement server 300 transmits the advertisement information and update condition information related to the advertisement information to the AP 200 in response to the advertisement request. The AP 200 transmits the advertisement information and the update condition information to the user device 100 and, accordingly, the user device 100 receives the advertisement information and the update condition information in step 509. Further, the controller 110 of the user device 100 updates the advertisement information by storing newly received advertisement information in the storage unit 175 in step 511. At this time, the update condition information may be also stored in the storage unit 175 along with the newly received advertisement information, so that a reference of the update condition may be changed.

Figure 5:
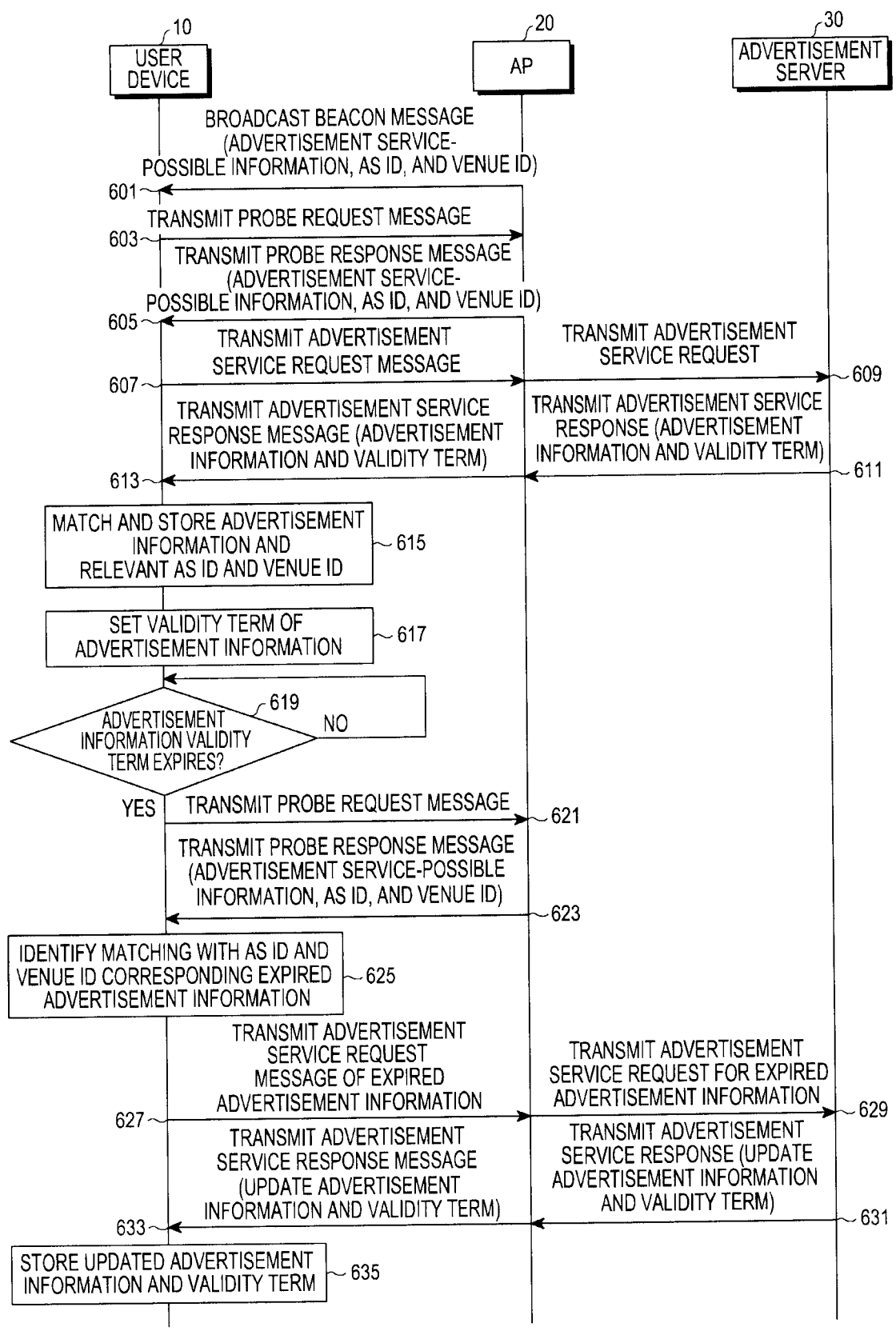
FIGS. 5 and 6 illustrate a process of transferring advertisement information according to various embodiments of the present invention.
Figure 6:
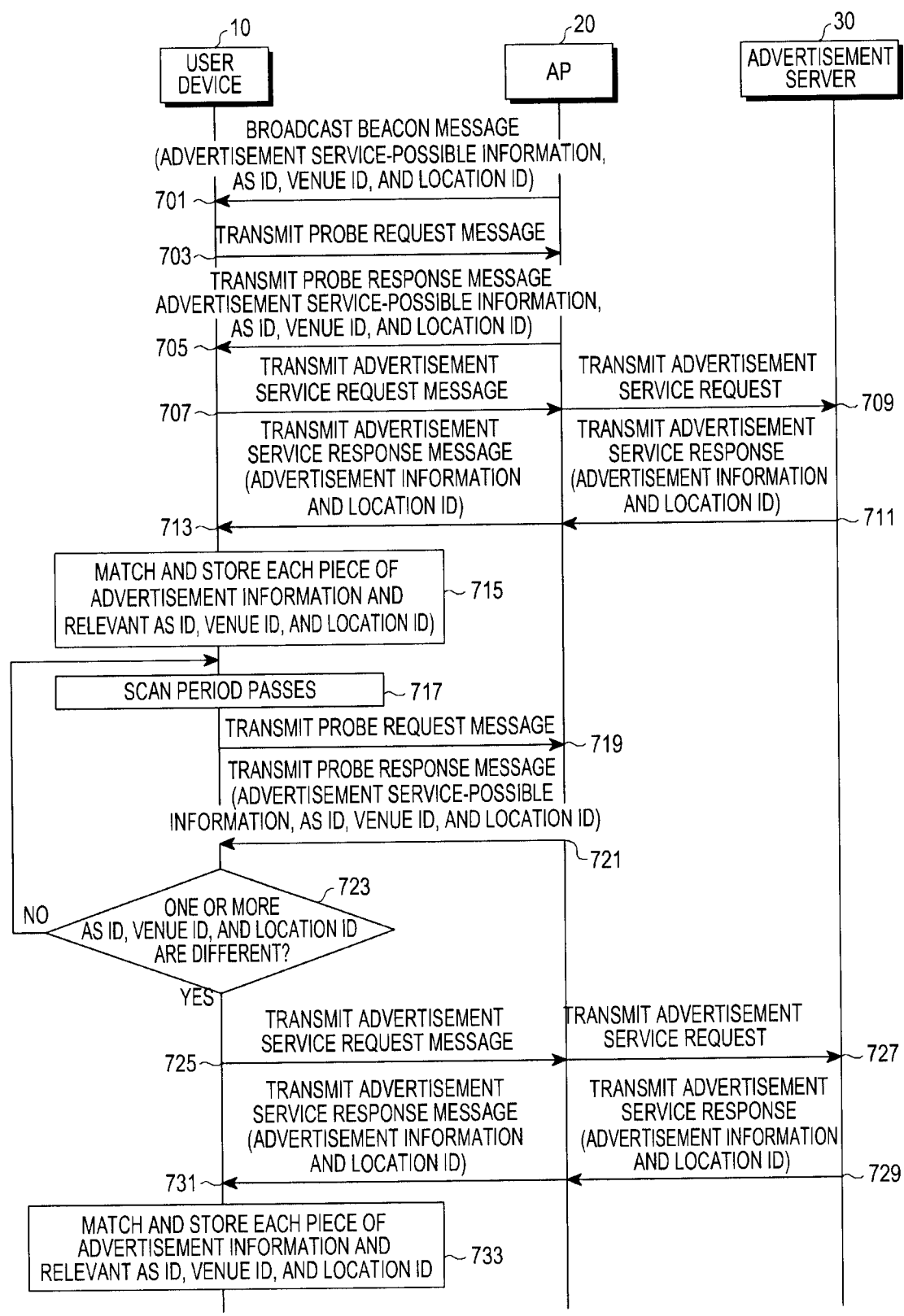
Figure 7A:
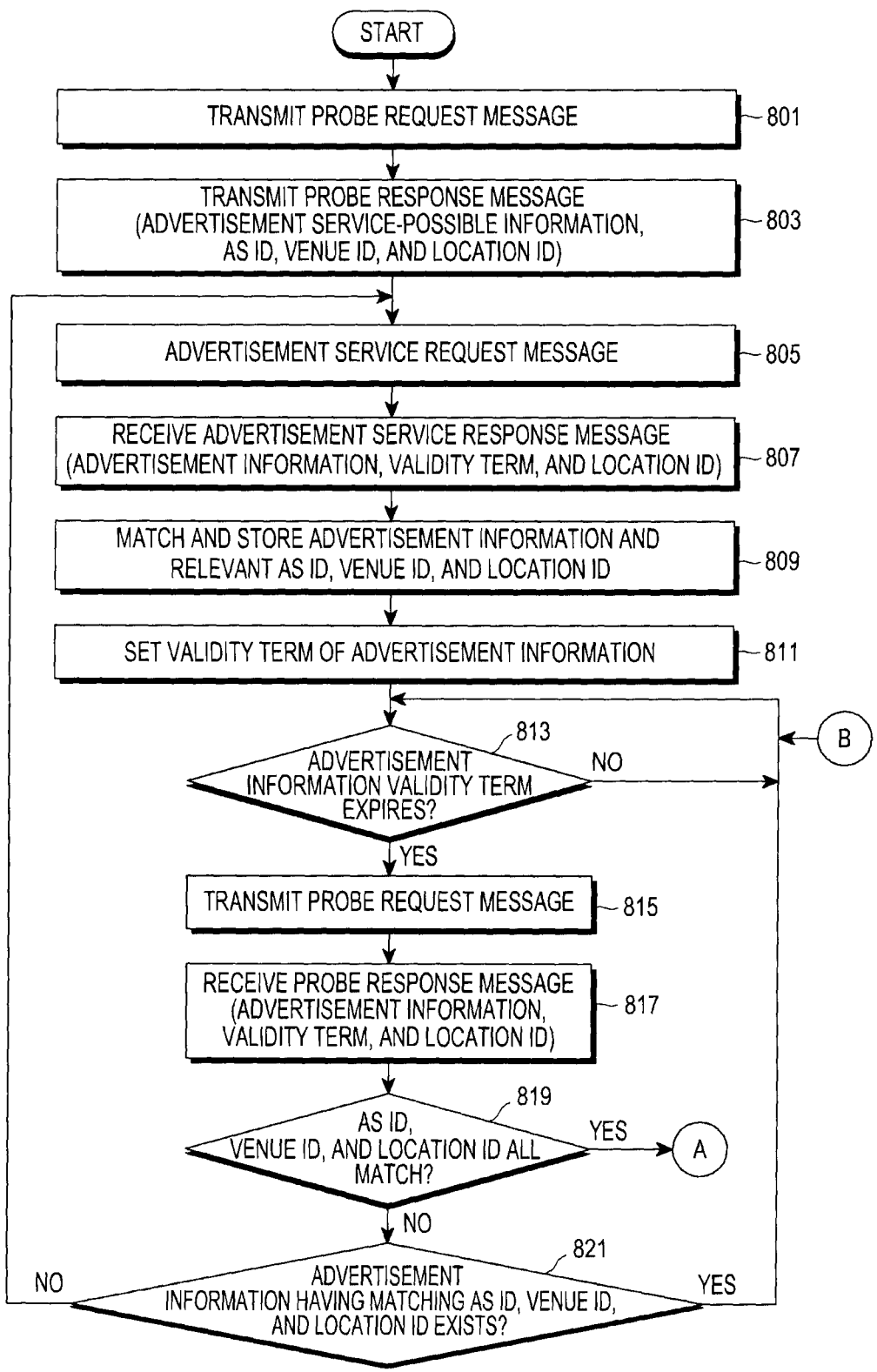
FIGS. 7A and 7B illustrate an operation process of the user device according to another embodiment of the present invention.
Figure 7B:
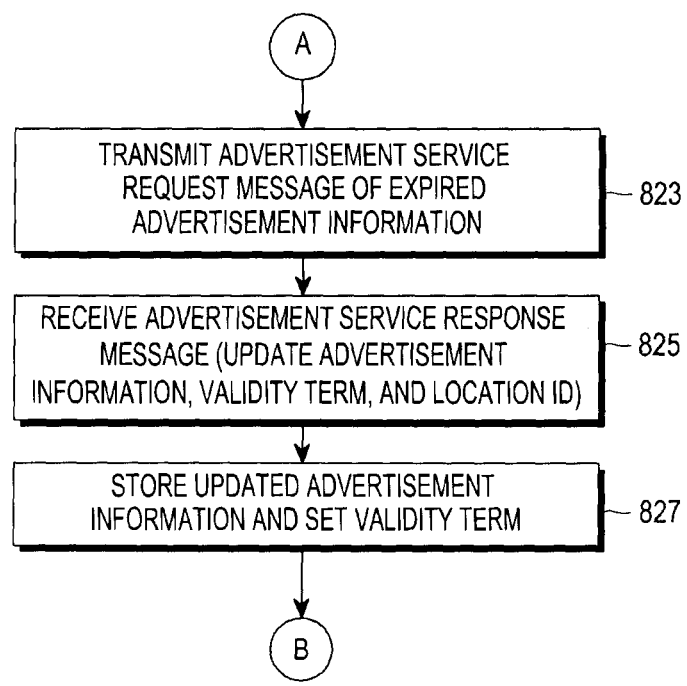

Next, the first embodiment to the third embodiment according to the present invention will be described with reference to FIG. 5 to FIG. 7B. FIG. 5 illustrates a process of updating advertisement information when update condition information corresponds to the validity term according to the first embodiment of the present invention. FIG. 6 illustrates a process of updating advertisement information when update condition information corresponds to location identification information according to the second embodiment of the present invention. In FIGS. 5 and 6, communication between the user device 100 and the AP 200 is short-range wireless communication, and an operation of the user device 100 is performed under a control of the controller 110. FIGS. 7A and 7B illustrate a process of updating advertisement information when update condition information includes both validity term information and location identification information according to the third embodiment of the present invention.

The first embodiment of the present invention is first described with reference to FIG. 5. Referring to FIG. 5, when the user device 100 enters a communicable area of the AP 200, the user device 100 may receive a beacon message broadcasted from the AP 200 in step 601 and scan for the AP 200. The beacon message may include information indicating that an advertisement service can be performed by the AP 200, an AS ID of the advertisement server 300 linked with the AP 200, and a venue ID corresponding to identification information of a content provider related to the advertisement server 300.

Alternatively, as the user device 100 transmits a probe request message to a neighboring AP, the AP 200 may receive the probe request message in step 603 and the user device 100 may receive a probe response message from the AP 200 in response to the probe request message, so that the AP 200 can be scanned for. At this time, the probe response message may include information indicating that an advertisement service can be performed by the AP 200, an AS ID of the advertisement server 300 linked with the AP 200, and a venue ID corresponding to identification information of a content provider related to the advertisement server 300.

The user device 100 may identify that the AP 200 is an AP, which supports the advertisement service, through serviceable information included in the received beacon message or probe response message. Accordingly, the user device 100 makes a control to transmit an advertisement service request message to the AP 200 in step 607. The AP 200 having received the advertisement service request message transmits an advertisement service request to the advertisement server 300 in step 609. The advertisement server 300 transmits an advertisement service response including at least one piece of advertisement information and validity term corresponding to each piece of the advertisement information to the AP 200 according to the advertisement service request in step 611. The AP 200 transmits an advertisement service response message including at least one piece of advertisement information and validity term corresponding to each piece of the advertisement information to the user device 100 in step 613.

The controller 110 of the user device 100 detects the advertisement information and the validity term corresponding to each of the advertisement information from the received advertisement service response message, matches each piece of the advertisement information, the AS ID, and the venue ID, and stores the matched information and IDs in the storage unit 175. Further, the controller 110 sets a validity term of each piece of the advertisement information in step 617. Thereafter, the controller 110 counts the validity term of each piece of the advertisement information and identifies whether there is advertisement information having an expired validity term in step 619. When there is advertisement information having the expired validity term, it is determined that the corresponding advertisement information is required to be updated. Accordingly, the controller 110 makes a control to transmit the probe request message in step 621.

When the AP 200 receives the probe request message in step 621, the AP 200 transmits a probe response message to the user device 100 in step 623.

The controller 110 of the user device 100 detects an AD ID and a venue ID included in the probe response message received in step 623. Further, the controller 110 compares whether the detected AS ID and venue ID match the stored AS ID and venue ID which have matched the advertisement information having the expired validity term. When they match each other based on a result of the comparison, the controller 110 makes a control to transmit an advertisement service request message of the advertisement information having the expired validity term to the AP 200 in step 627. In other words, the user device 100 makes a request for transmitting new advertisement information only with respect to the advertisement information having the expired validity term without making a request for re-transmitting all the advertisement information received in step 613.

When the AP 200 receives the advertisement service request message in step 627, the AP 200 transmits an advertisement service request for the advertisement information having the expired validity term to the advertisement server 300 in step 629. The advertisement server 300 transfers an advertisement service response including updated advertisement information and validity term to the AP 200 in step 631. The AP 200 transmits an advertisement service response message including the updated advertisement information and the validity term received from the advertisement server 300 to the user device 100 in step 633.

When the controller 110 of the user device 100 receives the advertisement service response message in step 635, the controller 110 detects the advertisement information and the validity term included in the received advertisement service response message. Further, the controller 110 stores the detected advertisement information instead of the advertisement information having the expired validity term identified in step 619 and resets the validity term, so as to update the advertisement information in step 639.

Meanwhile, the user device 100 may receive the probe response message from another AP which is not linked with the advertisement server 300 in response to the probe request message transmitted in step 621. In this case, the AS ID and the venue ID included in the probe response message received from the other AP may be different from the AS ID and the venue ID corresponding to the advertisement information having the expired validity term identified in step 619. Alternatively, probe response messages received from the AP 200 may have different AS IDs and different venue IDs. As described above, when the AS ID and the venue ID detected from the probe response message are different from the AS ID and the venue ID corresponding to the advertisement information having the expired validity term, it is determined that the update of the advertisement information having the expired validity term is impossible at present. Accordingly, the controller 110 may provide the user with a guideline on the expiration of the validity term of the corresponding advertisement information. Further, the controller 110 identifies whether there is advertisement information that matches the AS ID and the venue ID detected from the probe response message in the advertisement information stored in the storage unit 175. When there is no advertisement information that matches the AS ID and the venue ID detected from the probe response message based on a result of the identification, the controller 110 transmits a general advertisement service request message to the corresponding AP. In other words, the controller 110 transmits the advertisement service request message that makes a request for all pieces of advertisement information, which can be provided through the corresponding AP, without making a request for only the advertisement information having the expired validity term.

As described above, according to the first embodiment of the present invention, the user device 100 may update the advertisement information at a proper time point by acquiring validity term information of the advertisement information along with the advertisement information. Further, the user device 100 may update only the advertisement information having the expired validity term by managing the validity term according to each piece of advertisement information.

Next, the second embodiment according to the present invention is described with reference to FIG. 6. The second embodiment of the present invention describes a process of updating advertisement information when update condition information corresponds to location identification information (location ID).

Referring to FIG. 6, when the user device 100 enters a communicable area of the AP 200, the user device 100 may receive a beacon message broadcasted by the AP 200 in step 701 and scan for the AP 200. The beacon message may include information indicating that an advertisement service can be performed by the AP 200, an AS ID of the advertisement server 300 linked with the AP 200, a venue ID corresponding to identification information of a content provider related to the advertisement server 300, and location identification information. Alternatively, as the user device 100 transmits a probe request message to a neighboring AP, the AP 200 may receive the probe request message in step 703 and the user device 100 may receive a probe response message from the AP 200 in response to the probe request message, so that the AP 200 can be scanned for. At this time, the probe response message may include information indicating that an advertisement service can be performed by the AP 200, an AS ID of the advertisement server 300 linked with the AP 200, a venue ID corresponding to identification information of a content provider related to the advertisement server 300, and location identification information.

According to the second embodiment of the present invention, the AP 200 may store in advance location identification information corresponding to information on an area in which advertisement information received from the advertisement server 300 and provided to the user device can be effectively used, and the location identification information may be transferred to the user device through the beacon message and the probe response message.

The user device 100 may identify that the AP 200 is an AP, which supports the advertisement service, through serviceable information included in the received beacon message or probe response message. Accordingly, the user device 100 makes a control to transmit an advertisement service request message to the AP 200 in step 707. The AP 200 having received the advertisement service request message transmits an advertisement service request to the advertisement server 300 in step 709. The advertisement server 300 transmits an advertisement service response including at least one piece of advertisement information and location identification information corresponding to the advertisement information to the AP 200 according to the advertisement service request in step 711. The AP 200 transmits an advertisement service response message including at least one piece of advertisement information and location identification information corresponding to the advertisement information to the user device 100 in step 713.

The controller 110 of the user device 100 detects the advertisement information and the location identification information in the received advertisement service response message, matches each piece of the advertisement information, the AS ID, and the venue ID, and stores the matched information and IDs in the storage unit 175 in step 715. Further, the controller 110 counts a predetermined scan period in step 717 and, when the scan period passes, makes a control to transmit a probe request message in step 719.

When the AP 200 receives the probe request message in step 721, the AP 200 transmits a probe response message to the user device 100 in step 723.

The controller 110 of the user device 100 detects an AS ID, a venue ID, and location identification information included in the probe response message received in step 723. Further, in step 725, the controller 110 matches the detected location identification information with the location identification information which has matched the advertisement information and stored in step 715. When the location identification information is the same as each other based on a result of the comparison, the controller 110 determines that the advertisement information is not required to be updated and counts the scan period again in step 717.

However, when it is identified that the location identification information is different from each other based on a result of the comparison of step 723, the controller 110 determines that the advertisement information is required to be updated.

The difference in the location identification information means that the user device 100 is not located in an area in which the advertisement information stored in the user device 100 can be effectively used. Accordingly, the controller 110 makes a control to transmit the advertisement service request message that makes a request for new advertisement information to the AP 200 in step 725.

When the AP 200 receives the advertisement service request message in step 725, the AP 200 transmits an advertisement service request to the advertisement server 300 in step 727. The advertisement server 300 transmits an advertisement service response including new advertisement information and relevant location identification information to the AP 200 according to the request in step 729. The AP 200 transmits an advertisement service response message including the new advertisement information and the location identification information received from the advertisement server 300 to the user device 100 in step 731.

When the controller 110 of the user device 100 receives the advertisement service response message in step 731, the controller 110 detects advertisement information and location identification information included in the received advertisement service response message. Further, in step 733, the controller 110 matches and stores the advertisement information, the location identification information, and the AS ID and the venue ID detected in step 721.

As described above, according to the second embodiment of the present invention, the user device 100 may update the advertisement information at a proper time point by acquiring the location identification information of the advertisement information along with the advertisement information.

Next, the third embodiment according to the present invention is described with reference to FIGS. 7A and 7B. The third embodiment of the present invention describes a process of updating advertisement information when update condition information includes both validity term information and location identification information (location ID). FIGS. 7A and 7B illustrate an operation process of the user device 100 according to the third embodiment of the present invention.

Referring to FIG. 7A, the controller 110 transmits a probe request message to scan for a neighboring AP in step 801. The AP having received the probe request message transmitted from the user device 100 transmits a probe response message in response to the probe request message. In the present embodiment, it is assumed that the AP 200 receives the probe request message. Accordingly, the user device 100 receives the probe response message from the AP 200 in step 803, so that the AP 200 is scanned for. At this time, the probe response message may include information indicating that an advertisement service can be performed by the AP 200, an AS ID of the advertisement server 300 linked with the AP 200, a venue ID corresponding to identification information of a content provider related to the advertisement server 300, and location identification information. The user device 100 may scan for the AP 200 by receiving a beacon message broadcasted by the AP 200. The beacon message may include information indicating that an advertisement service can be performed by the AP 200, an AS ID of the advertisement server 300 linked with the AP 20, a venue ID corresponding to identification information of a content provider related to the advertisement server 300, and location identification information.

According to the third embodiment of the present invention, the AP 200 may store in advance location identification information corresponding to information on an area in which advertisement information received from the advertisement server 300 and provided to the user device can be effectively used, and the location identification information may be transferred to the user device through the beacon message and the probe response message.

The user device 100 may identify that the AP 200 is an AP, which supports the advertisement service, through serviceable information included in the received beacon message or probe response message. Accordingly, the controller 110 makes a control to transmit an advertisement service request message to the AP 200 in step 805. The AP 200 having received the advertisement service request message transmits an advertisement service request to the advertisement server 300. The advertisement server 300 transmits an advertisement service response including at least one piece of advertisement information, location identification information corresponding to each piece of advertisement information, and validity term information to the AP 200 according to the advertisement service request. The AP 200 transmits an advertisement service response message including at least one piece of advertisement information, location identification information corresponding to each piece of advertisement information, and validity term information to the user device 100.

The controller 110 of the user device 100 receives the advertisement service response message in step 807. Further, the controller 110 detects advertisement information, and location identification information and validity term information corresponding to each piece of advertisement information in the advertisement service response message, matches each piece of advertisement information, the AS ID, and the venue ID, and stores the matched information and IDs in the storage unit 175 in step 809. Further, the controller 110 sets a validity term of each piece of advertisement information in step 811.

Thereafter, the controller 110 counts the validity term of each piece of the advertisement information and identifies whether there is advertisement information having an expired validity term in step 813. When there is advertisement information having the expired validity term, it is determined that the corresponding advertisement information is required to be updated. Accordingly, the controller 110 makes a control to transmit the probe request message in step 815.

When the AP 200 receives the probe request message, the AP 200 transmits a probe response message to the user device 100 in response to the probe request message.

The controller 110 of the user device 100 detects an AS ID, a venue ID, and location identification information included in the received probe response message. Further, the controller 110 compares whether the detected AS ID, venue ID, and location identification information match the AS ID, the venue ID, and the location identification information corresponding to the advertisement information having the expired validity term in step 819. When they match each other based on a result of the comparison, the controller 110 makes a control to transmit an advertisement service request message of the advertisement information having the expired validity term to the AP 200 in step 823 of FIG. 7B. In other words, the controller 110 makes a request for transmitting new advertisement information only with respect to the advertisement information having the expired validity term.

When the AP 200 receives the advertisement service request message, the AP 200 transmits an advertisement service request for the advertisement information having the expired validity term to the advertisement server 300. The advertisement server 300 transfers an advertisement service response including updated advertisement information, validity term, and location identification information to the AP 200 according to the request. The AP 200 transmits an advertisement service response message including the updated advertisement information, the validity term, and the location identification information received from the advertisement server 300 to the user device 100.

When the controller 110 of the user device 100 receives the advertisement service response message in step 825, the controller 110 detects advertisement information, validity term, and location identification information included in the received advertisement service response message. Further, the controller 110 stores the detected advertisement information instead of the identified advertisement information having the expired validity term and resets the validity term in step 827, so as to update the advertisement information, and proceeds to step 813 of FIG. 7A to repeat the above process.

Meanwhile, when it is identified that the AS, ID, venue ID, and location identification information detected in the probe response message received in step 817 do not match the AS ID, venue ID, and location identification information corresponding to the advertisement information having the expired validity term in step 819 of FIG. 7A, the controller 110 proceeds to step 821.

The user device 100 may receive the probe response message from another AP which is not linked with the advertisement server 300 in response to the probe request message transmitted in step 815. In this case, the AS ID and the venue ID included in the probe response message received from the other AP may be different from the AS ID and the venue ID corresponding to the advertisement information having the expired validity term. Alternatively, probe response messages received from the AP 200 may have different AS IDs and different venue IDs. Alternatively, even though the AS IDs and the venue IDs are the same, location identification information may be different. In this case, it is determined that the update of the corresponding advertisement information is impossible at present. Accordingly, the controller 110 may provide the user with a guideline on the expiration of the validity term of the corresponding advertisement information.

The controller 110 identifies whether the advertisement information having the same AS ID, venue ID, and location identification information as the AS ID, venue ID, and location identification information detected in the probe response message received in step 817 exist in the storage unit 175 and, when the advertisement information exists in step 821, proceeds to step 813. However, when the advertisement information having the same AS ID, venue ID, and location identification information as the detected AS ID, venue ID, and location identification information do not exist in the storage unit 175, the controller 110 makes a control to transmit the advertisement service request message that makes a request for new advertisement information in step 805, so as to acquire new advertisement information.

As described above, according to the third embodiment of the present invention, the user device 100 may update the advertisement information at a proper time point by acquiring the validity term information and the location identification information of the advertisement information along with the advertisement information. Further, the user device 100 may update only the advertisement information having the expired validity term by managing the validity term according to each piece of advertisement information.

Although specific embodiments are described in the above description of the present invention, various modifications can be made without departing from the scope of the present invention. Accordingly, the scope of the present invention shall not be determined by the above-described embodiments, and is to be determined by the following claims and their equivalents.

The invention claimed is:

1. A method of updating advertisement information by a user device, the method comprising:
   scanning for an access point device;
   transmitting a first advertisement service request message for requesting at least one piece of advertisement information to the access point device;
   receiving a first advertisement service response message including the at least one piece of advertisement information and update condition information corresponding to the at least one piece of advertisement information from the access point device, wherein the at least one piece of advertisement information is associated with at least one piece of server identification information of at least one advertisement server;
   detecting first advertisement information to be updated based on the update condition information;
   based on detecting the first advertisement information to be updated, transmitting a probe request message;
   receiving a probe response message including server identification information of an advertisement server connected with the access point device;
   detecting whether the server identification information of the advertisement server included in the probe response message is identical to first server identification information associated with the first advertisement information to be updated;
   based on detecting that the server identification information of the advertisement server included in the probe response message is identical to the first server identification information, transmitting a second advertisement service request message of the first advertisement information to be updated;
   receiving a second advertisement service response message; and
   updating the first advertisement information based on the second advertisement response message.

2. The method of claim 1,
   wherein the update condition information includes at least one piece of validity term information indicating a validity term corresponding to the at least one piece of advertisement information respectively,
   wherein the at least one piece of advertisement information is stored in a memory of the user device to be associated with the validity term corresponding to the at least one piece of advertisement information respectively, and
   wherein the detecting of the first advertisement information to be updated based on the update condition information comprises:
   detecting the first advertisement information to be updated in the at least one piece of advertisement information based on a first validity term corresponding to the first advertisement information to be updated.

3. The method of claim 2,
   wherein the probe response message further includes content provider identification information, and
   wherein the detecting of the first advertisement information to be updated based on the update condition information further comprises:
   detecting whether the content provider identification information included in the probe response message is identical to first content provider identification information associated with the first advertisement information to be updated.

4. The method of claim 3, further comprising storing second validity term information and second advertisement information included in the second advertisement service response message in the memory.

5. The method of claim 3, further comprising, based on detecting that the server identification information included in the probe response message and the content provider identification information included in the probe response message are not identical to the first server identification information and the first content provider identification information associated with the first advertisement information to be updated, transmitting a third advertisement service request message of all of the at least one piece of advertisement information.

6. The method of claim 1,
   wherein the update condition information includes at least one piece of location identification information indicating a valid area of the at least one piece of advertisement information respectively, and
   wherein the method further comprises:
   detecting location identification information included in the probe response message; and
   detecting that the location identification information included in the probe response message is different from first location identification information associated with the first advertisement information to be updated.

7. The method of claim 1, wherein the update condition information includes at least one piece of validity term information indicating a validity term corresponding to the at least one piece of advertisement information respectively and location identification information indicating a valid area corresponding to the at least one piece of advertisement information respectively.

8. The method of claim 3, further comprising:
   detecting that the server identification information included in the probe response message, the content provider identification information included in the probe response message, and location identification information included in the probe response message are identical to the first server identification information, the first content provider identification information, and first location identification information associated with the first advertisement information to be updated.

9. The method of claim 8, further comprising:
   when the server identification information included in the probe response message, the content provider identification information included in the probe response message, and the location identification information included in the probe response message are not identical to the first server identification information, the first content provider identification information, and the first location identification information associated with the first advertisement information to be updated and when advertisement information that matches server identification information, content provider identification information, and location identification information identical to the server identification information included in the probe response message, the content provider identification information included in the probe response message, and the location identification information included in the probe response message is not stored in the memory, transmitting a third advertisement service request message of all of the at least one piece of advertisement information.

10. An apparatus for updating advertisement information, the apparatus comprising:
a short-range communication circuit configured to perform short-range wireless communication with a neighboring access point device;
a memory; and
a controller configured to:
scan for an access point device by controlling the short-range communication circuit,
transmit a first advertisement service request message for requesting at least one piece of advertisement information to the access point device through the short-range communication circuit,
receive a first advertisement service response message including the at least one piece of advertisement information and update condition information corresponding to the at least one piece of advertisement information from the access point device, wherein the at least one piece of advertisement information is associated with at least one piece of server identification information of at least one advertisement server,
detect first advertisement information to be updated based on the update condition information,
based on detecting the first advertisement information to be updated, transmit a probe request message through the short-range communication circuit,
receive a probe response message including server identification information of an advertisement server connected with the access point device through the short-range communication circuit,
detect whether the server identification information of the advertisement server included in the probe response message is identical to first server identification information associated with the first advertisement information to be updated,
based on detecting that the server identification information of the advertisement server included in the probe response message is identical to the first server identification information, transmit a second advertisement service request message of the first advertisement information to be updated through the short-range communication circuit,
receive a second advertisement service response message through the short-range communication circuit, and
update the first advertisement information based on the second advertisement response message.

11. The apparatus of claim 10,
wherein the update condition information includes at least one piece of validity term information indicating a validity term corresponding to the at least one piece of advertisement information respectively,
wherein the at least one piece of advertisement information is stored in a memory to be associated with the validity term corresponding to the at least one piece of advertisement information respectively, and
wherein the controller is configured to:
detect the first advertisement information to be updated in the at least one piece of advertisement information based on a first validity term corresponding to the first advertisement information to be updated.

12. The apparatus of claim 11,
wherein the probe response message further includes content provider identification information,
wherein the controller is further configured to:
detect whether the content provider identification information included in the probe response message is identical to first content provider identification information associated with the first advertisement information to be updated.

13. The apparatus of claim 12, wherein the controller is further configured to store second validity term information and second advertisement information included in the second advertisement service response message in the memory.

14. The apparatus of claim 13, wherein the controller is further configured to:
based on detecting that the server identification information included in the probe response message and the content provider identification information included in the probe response message are not identical to the first server identification information and the first content provider identification information associated with the first advertisement information to be updated, and
transmit a third advertisement service request message of all of the at least one piece of advertisement information through the short-range communication circuit.

15. The apparatus of claim 10,
wherein the update condition information includes at least one piece of location identification information indicating a valid area of the at least one piece of advertisement information respectively, and
wherein the controller is further configured to:
detect location identification information included in the probe response message, and
detect that the location identification information included in the probe response message is different from first location identification information associated with the first advertisement information to be updated.

16. The apparatus of claim 10, wherein the update condition information includes at least one piece of validity term information indicating a validity term corresponding to the at least one piece of advertisement information respectively and location identification information indicating a valid area corresponding to the at least one piece of advertisement information respectively.

17. The apparatus of claim 12, wherein the controller is further configured to:
detect the server identification information included in the probe response message, the content provider identification information included in the probe response message, and location identification information included in the probe response message are identical to the first server identification information, the first content provider identification information, and first location identification information associated with the first advertisement information to be updated.

18. The apparatus of claim 17, wherein the controller is further configured to:
when the server identification information included in the probe response message, the content provider identification information included in the probe response message, and the location identification information included in the probe response message are not identical to the first server identification information, the first content provider identification information, and the first location identification information associated with the first advertisement information to be updated and when advertisement information that matches server identification information, content provider identification information, and location identification information identical to the server identification information included in the probe response message, the content provider identification information included in the probe response message, and the location identification information included in the probe response message is not stored in the memory, transmit a third advertisement service request message of all of the at least one piece of advertisement information through the short-range communication circuit.

* * * * *